US008719408B2

(12) United States Patent
Carter et al.

(10) Patent No.: US 8,719,408 B2
(45) Date of Patent: *May 6, 2014

(54) AUTOMATED DIGITAL MEDIA CONTENT FILTRATION BASED ON RELATIONSHIP MONITORING

(75) Inventors: Bernadette A. Carter, Cary, NC (US); Belinda Y. Chang, Cary, NC (US); Fuyi Li, Sudbury, MA (US); Pamela A. Nesbitt, Tampa, FL (US); Anne I. Ryan, Durham, NC (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,765

(22) Filed: Sep. 6, 2012

(65) Prior Publication Data

US 2012/0331141 A1 Dec. 27, 2012

Related U.S. Application Data

(63) Continuation of application No. 12/134,859, filed on Jun. 6, 2008, now Pat. No. 8,307,066.

(51) Int. Cl.
*G06F 15/16* (2006.01)
*G06F 15/173* (2006.01)
*G06F 15/177* (2006.01)

(52) U.S. Cl.
USPC ........... 709/224; 709/223; 709/227; 709/231; 709/238

(58) Field of Classification Search
USPC .......................... 709/223, 224, 227, 231, 238
See application file for complete search history.

(56) References Cited

U.S. PATENT DOCUMENTS

| | | | |
|---|---|---|---|
| 4,996,642 A | 2/1991 | Hey | |
| 6,041,311 A | 3/2000 | Chislenko et al. | |
| 6,102,969 A | 8/2000 | Christianson et al. | |
| 6,195,657 B1 | 2/2001 | Rucker et al. | |
| 7,113,917 B2 | 9/2006 | Jacobi et al. | |
| 2001/0021914 A1 | 9/2001 | Jacobi et al. | |
| 2002/0116466 A1 | 8/2002 | Trevithick et al. | |
| 2003/0050977 A1 | 3/2003 | Puthenkulam et al. | |
| 2006/0224675 A1 | 10/2006 | Fox et al. | |
| 2007/0233736 A1 | 10/2007 | Xiong et al. | |
| 2008/0040474 A1 | 2/2008 | Zuckerberg et al. | |
| 2008/0104172 A1 | 5/2008 | Craig | |

(Continued)

OTHER PUBLICATIONS

Daniyalzade et al., Facebook Friend Suggestion, Autumn 2007, Retrieved from: http://cs229.stanford.edu/proj2007/DaniyalzadeLipus-FacebookFriendSuggestion.pdf, pp. 1-9.

(Continued)

*Primary Examiner* — Chau Le
(74) *Attorney, Agent, or Firm* — Thomas E. Lees, LLC

(57) ABSTRACT

Automated digital media content filtration is performed by establishing automatically, according to a tolerance parameter, a plurality of user relationships, each user relationship based on monitoring an online association between a user and a content producer. Filtration is also performed by monitoring determined user relationships, interacting with a plurality of independent servers to identify digital media content published by content producers having a user relationship with the user and determining a relevancy weight for each published digital media content item, the relevancy based on a strength factor. Filtration is still further performed by presenting the digital media content published by one or more of the content producers to the user such that digital media content having a greater relevancy weight receives a higher priority than other digital media content available to the user from the plurality of content producers.

24 Claims, 7 Drawing Sheets

(56) References Cited

U.S. PATENT DOCUMENTS

| | | |
|---|---|---|
| 2008/0235592 A1 | 9/2008 | Trauth |
| 2008/0250332 A1 | 10/2008 | Farrell et al. |
| 2009/0070684 A1 | 3/2009 | Aldrich et al. |
| 2009/0271370 A1 | 10/2009 | Jagadish et al. |

OTHER PUBLICATIONS

BlogFoward: Money, "Analysis: FriendFeed shines, Plaxo Pulse grows". http://www.blogforward.com/money/2008/01|10/analysis-friendfeed-shines . . . , May 2, 2008.

Kennedy, Lyndon S., "Leveraging Social Networks for Organizing and Browsing Shared Photographs", Accessed no later then Nov. 20, 2007.

Green, Heather, "One Place for Your Many Online Lives", http://www.businessweek.com/magazine/content|08__16/b4080054303377 . . . , Business Week, Info Tech, Apr. 10, 2008.

Facebook, http://www.facebook.com/, Accessed no later then Nov. 20, 2007.

Yahoo, http://new.music.yahoo.com/, Accessed no later then Nov. 20, 2007.

YouTube, LLC, http://youtube.com/, Accessed no later then Nov. 20, 2007.

AUTOMATED DIGITAL MEDIA CONTENT FILTRATION BASED ON RELATIONSHIP MONITORING

CROSS REFERENCE TO RELATED APPLICATION

This application is a continuation of U.S. patent application Ser. No. 12/134,859, entitled AUTOMATED DIGITAL MEDIA CONTENT FILTRATION BASED ON RELATIONSHIP MONITORING", filed Jun. 6, 2008, now allowed, the disclosure of which is incorporated by reference herein.

BACKGROUND

This invention relates to digital media content filtration and more particularly relates to automated digital media content filtration based on relationship monitoring.

With the proliferation of social networking websites such as Facebook and MySpace, a typical computer user may publish and have access to massive amounts of digital media content, including images, videos, and music, on a daily basis. Friends may send media to one another in a casual setting, or professionals may send similar content in a work setting. Furthermore, in a social networking site, content may be broadcast to all members or a subset of members. Consequently, social networking websites, as with other internet technologies such as email and Instant Messaging ("IM") programs, may lead to an individual being overloaded with information.

Sites such as MySpace and Facebook allow users to associate contacts or "friends" with user profiles to enable messages and media to be sent back and forth. Often, users have dozens if not hundreds of friends in their online social network. These friends may publish several media content items per day or per week. As a result, users are bombarded with massive quantities of media and are forced to sift through this media to find items they want.

One solution by Facebook is the "newsfeed," which keeps a running tab of the most recent events, including media uploads, of a user's friends. Each action is given equal weight on the newsfeed. With the advent of Facebook applications, an application named "Top Friends" has been created, where a user may manually select his "top friends" so that he does not have to sift through his mass friend list to find them.

Image and video sites such as flickr and YouTube allow users to upload and tag media so that other users in the online community may view, comment, and rate the media. This allows the members of the community to make more accurate searches for media as well as determine by rating what should be at the top of the search list. However, the top rated media still may not be relevant to a user who has particular interests or tastes.

With respect to the music service industry, the Yahoo! Music service allows users to construct a custom station that is based on music enjoyed by friends on the users' Yahoo Messenger buddy list. This allows for users to be exposed to music of interest to their friends. However, the Yahoo! Music service requires users to manually rate each song.

BRIEF SUMMARY

According to aspects of the present invention, automated digital media content filtration based on relationship monitoring, comprises establishing automatically, according to a tolerance parameter, a plurality of user relationships, each user relationship based on monitoring an online association between a user and a content producer. Automated digital media content filtration is further performed by monitoring determined user relationships for relationship interactions, by interacting with a plurality of independent servers as a third party to identify digital media content published by content producers having a user relationship with the user, the digital media content comprising at least one digital media content item and by determining a relevancy weight for each published digital media content item, the relevancy based on a strength factor derived on monitored relationship interactions between the user and the content producer that published the published digital media content. Automated digital media content filtration is still further performed by presenting the digital media content published by one or more of the content producers to the user such that digital media content having a greater relevancy weight receives a higher priority than other digital media content available to the user from the plurality of content producers.

BRIEF DESCRIPTION OF THE SEVERAL VIEWS OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
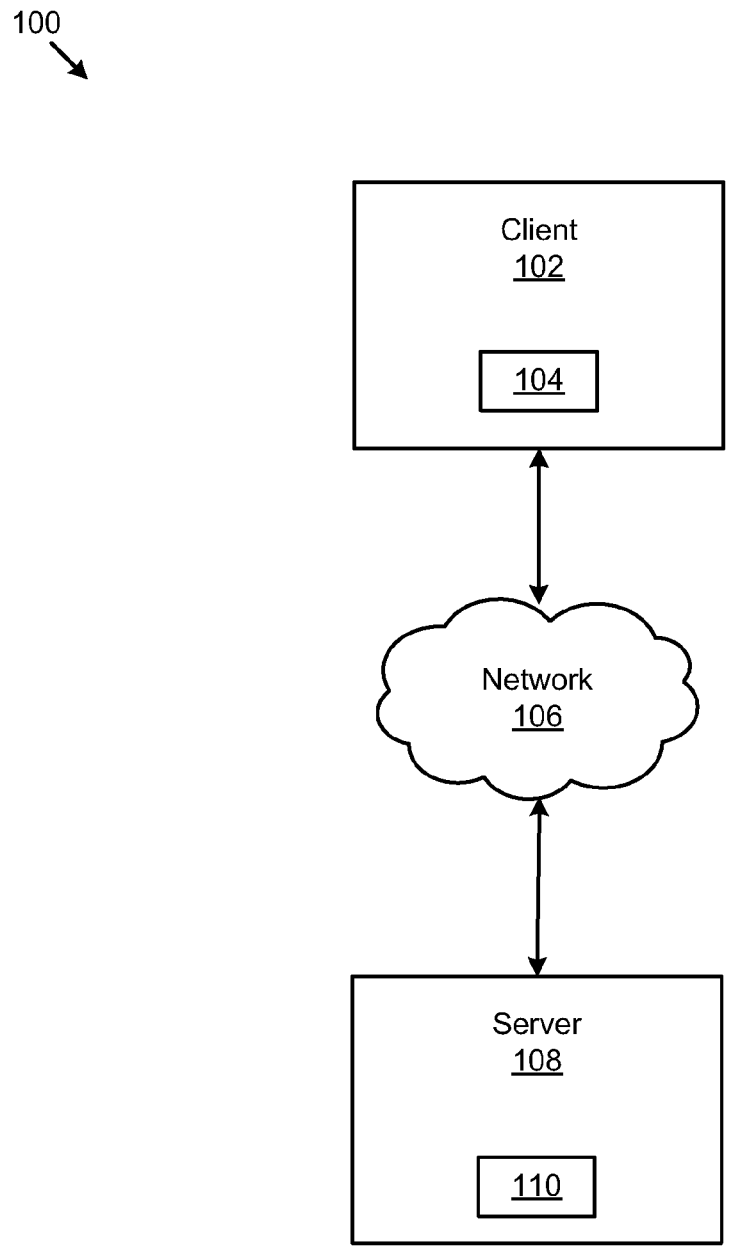
FIG. 1 is a schematic block diagram illustrating one embodiment of a system for automated digital media content filtration based on relationship monitoring.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for automated digital media content filtration based on relationship monitoring. The system 100 includes a client 102 with a media aggregator 104, a network 106, and a server 108 with a media filtering apparatus 110. Those of skill in the art recognize that the system 100 may be simpler or more complex than illustrated, so long as the system 100 includes modules or sub-systems that correspond to those described herein.

The client 102 may be a personal computer, a digital picture frame, a television, a cell phone, or any other electronic device capable of interfacing either directly or indirectly with a network 106. Furthermore, the client may comprise a media aggregator 104. The media aggregator 104 gathers digital media content from a plurality of sources and organizes and presents that aggregated content to a user. Therefore, the media aggregator 104 on the client 102 may be any device or software application capable of storing, displaying, or referencing digital media content. Examples of media aggregators 104 may include but not be limited to an internet browser, an internet browser plug-in, and digital image display software on a personal computer or handheld device. In one embodiment, the media aggregator 104 may comprise a software web browser such as Internet Explorer or Mozilla Firefox capable of displaying digital media. If the client 102 is a cell phone, the media aggregator 104 may comprise a cell phone application capable of displaying digital images, video, or playing digital music. The digital media content may comprise, but is not limited to digital video, music, pictures, Hypertext Transfer Protocol (HTTP) documents, and the like.

The client 102 communicates over a network 106 with the server 108 to receive digital media content. Alternatively, or in addition, the client 102 may receive digital media content from many servers 108 in different locations. The network 106 may comprise a global communications network such as the Internet, a cellular communications network, or other communications network. Furthermore, the server 108 may be a server running a social networking website application, or a media sharing community website.

The server 108 may include a media filter 110. The media filter 110 residing on the server 108 may interface with the social networking application to sort and filter the incoming digital media as will be described hereafter. The media filter 110 may automatically filter through the vast amounts of digital media the server 108 receives for multiple users. The media filter 110 may ensure that a user receives digital media that is most relevant and most of interest to the user. The media filter 110 may be fully configurable by the user thereby allowing the user the greatest possible control over the media content delivery. Furthermore, the media filter 110 is not limited in location to a server. Specifically, the media filter 110 may be located on the client and may comprise an application running on a user's computer.

Figure 2:
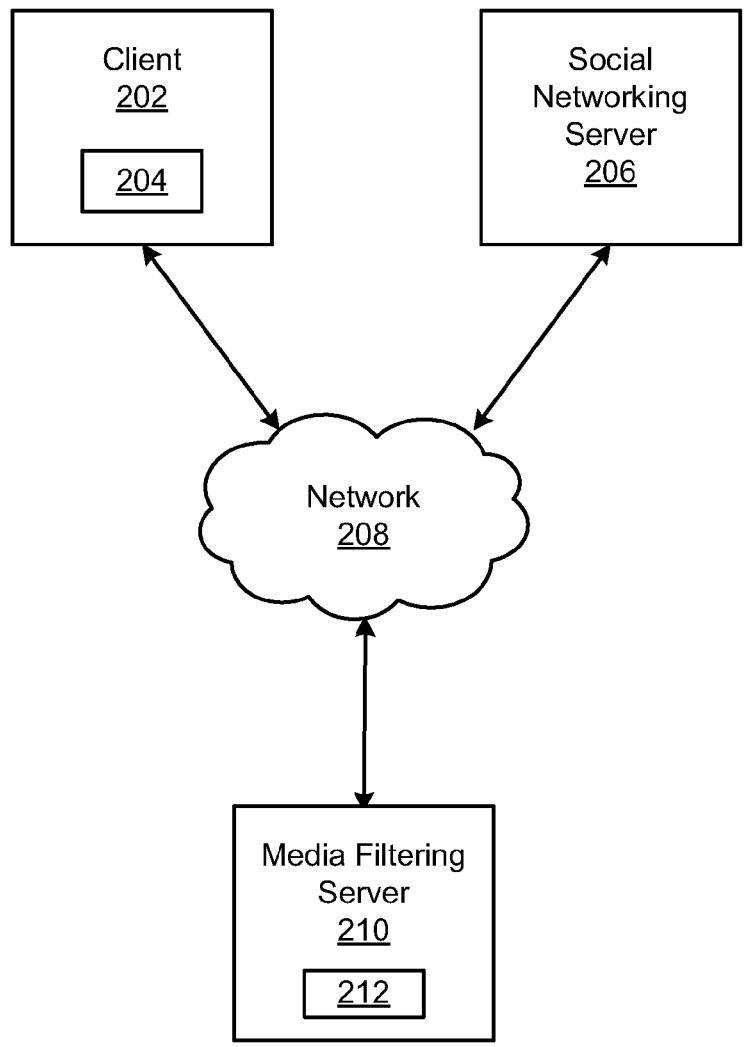
FIG. 2 is a schematic block diagram illustrating an alternative embodiment of a system for automated digital media content filtration based on relationship monitoring.

FIG. 2 illustrates a preferred embodiment of a system 200 for automated digital media content filtration based on relationship monitoring. The system 200 includes a client 202 with a media aggregator 204, a social networking server 206, a network 208, and a media filtering server 210 with a media filter 212. Those of skill in the art recognize that the system 200 may be simpler or more complex than illustrated, so long as the system 200 includes modules or sub-systems that correspond to those described herein.

The client 202 with its associated media aggregator 204 and the network 208 may be similar to the client 102, media aggregator 104, and network 106 described above in relation to FIG. 1. In addition, the social networking server 206 may be similar to the server 108 illustrated in FIG. 1. In this embodiment, the media filter 212 is similar to the media filter 110 described above in relation to FIG. 1. However, the media filter 212 is not located on the social networking server 206 in this embodiment, but is located on the media filtering server 210. The media filter 212 is not located on a particular media content or social networking server. Furthermore, the media filtering server 210 may be in direct communication with the social networking server 206. Alternatively, the media filtering server 210 may comprise a third-party server which handles the media filtering for a plurality of social networking websites or other websites involving digital media distribution. In this embodiment, the media filter 212 may monitor user relationships through various websites and other devices such as cell phones.

Figure 3:
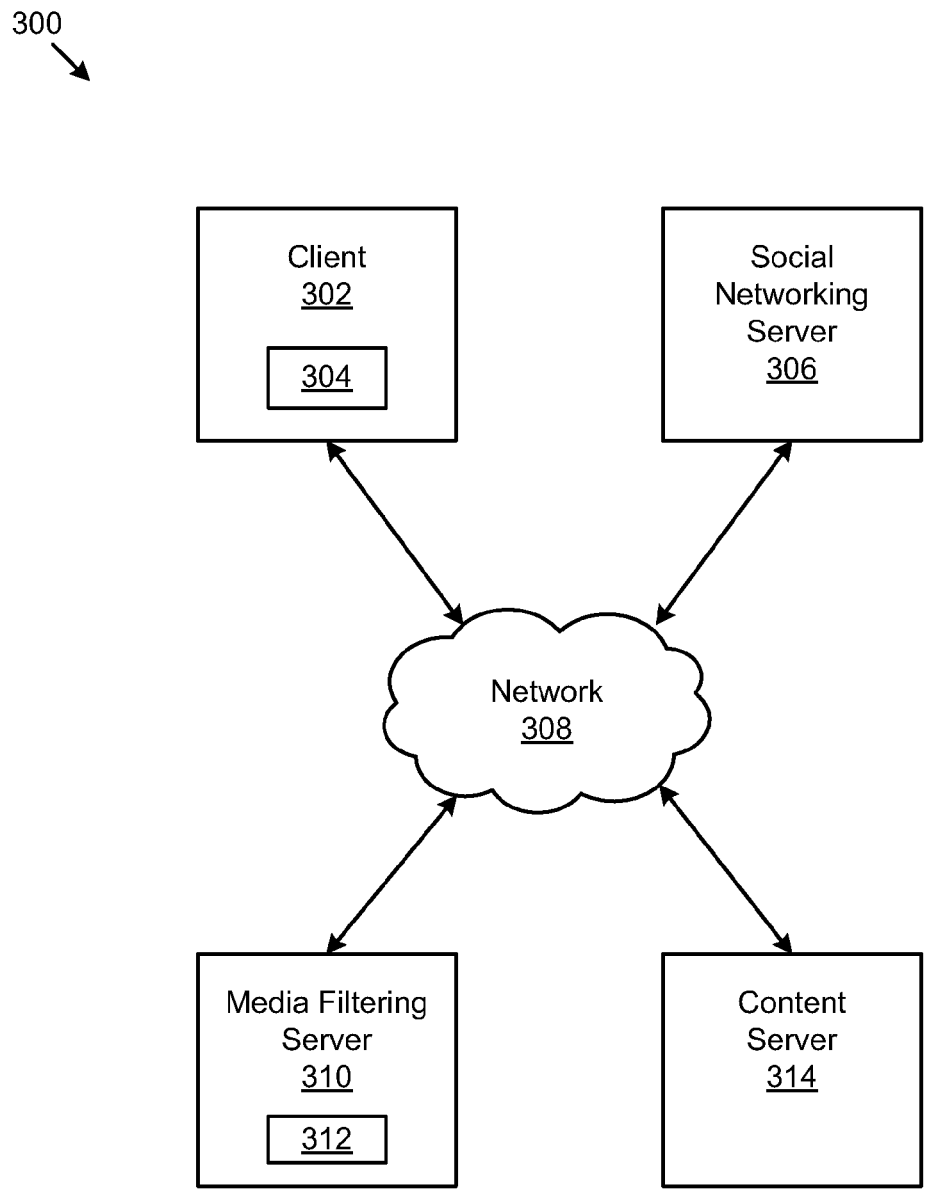
FIG. 3 is a schematic block diagram illustrating another alternative embodiment of a system for automated digital media content filtration based on relationship monitoring.

FIG. 3 illustrates another embodiment of a system 300 for automated digital media content filtration based on relationship monitoring. The system 300 includes a client 302 with a media aggregator 304, a social networking server 306, a network 308, a media filtering server 310 with a media filter 312, and a content server 314.

The client 302 with its associated media aggregator 304, the network, and the media filtering server 310 with the media filter 312 may be similar to the client 202, media aggregator 204, network 206, and the media filtering server 210 with the media filter 212 described above in relation to FIG. 2. However, in this embodiment, a content server 314 generates content which will be filtered by the media filtering server 310. The content server 314 may be a specialty content website or server which may produce or broadcast content to many users.

Figure 4:
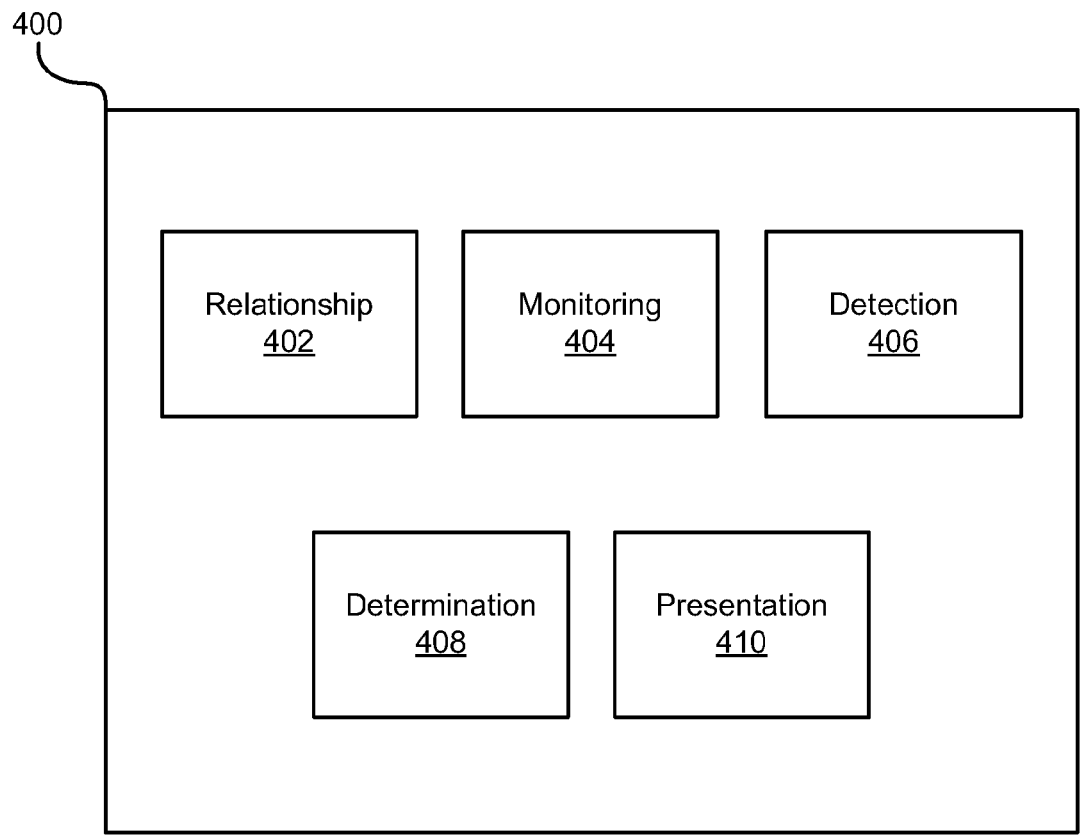
FIG. 4 is a schematic block diagram illustrating one embodiment of an apparatus for automated digital media content filtration based on relationship monitoring.

FIG. 4 illustrates one embodiment of an automated digital media content filtration apparatus 400 based on relationship monitoring. The apparatus 400 depicts one embodiment of a media filtering apparatus 212 that may be located on a media filtering server 210 and includes a relationship module 402, a monitoring module 404, a detection module 406, a determination module 408, and a presentation module 410.

In one embodiment, the relationship module 402 determines a plurality of user relationships. A user relationship may be any electronic association, or any association capable of being tracked or monitored electronically that a user has with a content producer. Therefore, a user relationship may constitute but is not limited to a phone call, a series of phone calls, an email, a series of emails, a chat, or similar online associations. Other online associations may include a user's actions on a social networking website such as sending a message to another user, sending a certain number of messages to another user, or including another user in an address book or contact list. The user relationships may be based in part by an online association.

Furthermore, a user relationship may be formed and determined by the relationship module 402 according to a tolerance parameter based on the number, amount, or type of electronic associations. For example, the relationship module 402 may be configured to determine a user relationship when the number of emails between the user and a specific individual meets a predefined threshold. A user could also manually add relationships to the relationship module 402 or assign other criteria, such as shared interests, which the relationship module 402 uses to determine that a relationship exists.

A user relationship may be created in memory as a data structure comprising a user ID, a content producer ID, a strength factor, and the like. Moreover, the user relationship may be stored in database using columns similar to the fields described above. Those of skill in the art recognize that the data structure or storage of a user relationship may be simpler or more complex than described, so long as the user relationship is associated with a user and one or more content producers.

A content producer may be any source of media content to a user. A content producer may be an individual who sends emails containing digital media to the user or who broadcasts digital media to the user along with other users on a social networking website. A content producer may be a group of individuals affiliated with a common user-defined association. In addition, a content producer may be a company sending digital content over the internet to the user as advertisements. In the corporate setting, a content producer may be a user's employer, design team, or management group. In the social networking community, a content producer may be another user on a social networking site who makes digital media content publicly available. Therefore, the content producers may be other contacts or "friends" on a social networking website, media website, or any other online community. The content producer may be another person with an online identity, or the content producer may be a website or digital television channel. In addition, the content producer may be a news, video, or music service from which the user receives media content. Moreover, the social networking website itself may be the content producer if it sends media in the form of messages or advertisements to the user.

The determination module 408 may determine user relationships when a user adds another user to his "friends" list, when a user is added to another user's "friends" list, when an added "friend" has other "friends" with which the user could interact, when a user receives an email or a predetermined number of emails from a single source, or other such online associations.

The monitoring module 404 monitors one or more user relationships between the user and the content producers. For each user relationship, the monitoring module 404 watches for a relationship interaction between the user and the content producer. Similar to a user association as described above, a relationship interaction could be any number of interactions possible between a user and a content producer as long as the interaction is traceable or detectable. Furthermore one or more relationship interactions may form a user association. A relationship interaction between a user and a content producer may comprise a phone call, an instant message, a text message, communication through a variety of software applications, the programs viewed by a user on digital television or the like.

In the online realm, a relationship interaction may include such things as sending an email or an instant message, purchasing an item from a website, or other site-specific interactions. For example, on one social networking website, an interaction between a user and a content producer may comprise the user viewing a profile of the content producer, sending a message to the content producer, sending a gift to the content producer, posting a message on the message board of the content producer, tagging a person on an image displayed by the content producer, or sending a comment to the content producer. Moreover, a relationship interaction may not be limited to interactions instigated by the content producer. For example, if a content producer sends an email to a user, a relationship interaction may occur if the user actually opens the email. A relationship interaction may not occur in the case of mass market emails which a user never views or reads.

A relationship interaction may be represented as relationship interaction data using a data structure that identifies the user, the content producer, the type of interaction, the time and date of the interaction, and other such information. The monitoring module 404 may store a record of each relationship interaction with information specifying the type of interaction along with the identity of the content producer and any mutual interests between the user and the content producer if applicable. This data may be generated by the source or medium of the interaction and the generation of such data may vary accordingly. For example, if the relationship interaction is an email, the relationship interaction data may be obtained from the metadata embedded in the email message. For a cell phone call the data may be obtained from the cell phone provider. The monitoring module 404 may pull this relationship interaction data from the source, or receive the relationship interaction data. Furthermore, the monitoring module 404 may exist as, or may operate in conjunction with a software application that monitors a user's relationship interactions.

The monitoring module 404 may also monitor where or in what capacity the relationship interactions occur. For example, the monitoring module 404 may determine that certain relationship interactions occurred while the user was working or while the user was at home. Specifically, the monitoring module 404 may store whether an interaction involved an email from a user's work email address or home address. Similarly, whether an email sent from a user was to an individual's work or home email address may also be stored. A user may also create certain categories under which the relationship interactions belong such as hobbies, finances, family, and gardening.

The detection module 406 identifies media content published by a content producer having a user relationship with the user. The media content may comprise but is not limited to digital images, digital audio, web pages, video, emails, text messages, and word processing documents. Furthermore, publishing this media content may consist of any proliferation of such content by electronic means. For example, media content may be published when attached to an email, sent as a message on a social networking website, sent as a web link over an instant messaging program, attached to a text message, and the like.

The detection module 406 may receive media content by scanning emails, messages, social networking website messages, and other such methods in search of media content. The detection module 406 may be configured to find media based on the file extension, file size, or keyword. In another embodiment, the publication of digital media content by the content producer notifies the detection module 406. In addition to scanning and searching incoming media, in certain embodiments, the detection module 406 polls a content source for the available media content.

To determine an associated content producer for media content, the detection module 406 may identify a content producer by reviewing application data available from a social networking website. Also, the content producer may be identified by metadata or other data included with a message or communication such as a caller's phone number or an Internet Protocol ("IP") address from the sender of an email.

The determination module 408 determines a relevancy weight for each published digital media content item. The relevancy weight is based on a strength factor derived at least in part on the monitored relationship interactions between the user and the content producer. In some embodiments, the strength factor is correlated with the number of monitored relationship interactions. Therefore, the greater the number of relationship interactions, the higher the strength factor. In another embodiment, the type of relationship interaction determines the strength factor. For example, a cell phone call may have a greater impact on the strength factor than an email. Furthermore, the time of the day, week, or month of the user interaction may also have different influences on the strength factor. For example, an instant message on a Sunday may not increase the strength factor to the degree that an instant message on a Monday. These settings may be configurable by the user or the social networking site. The strength factor may decrease over time as the number of monitored user relationships decrease. Moreover, the strength factor may be decreased if the relationship interaction is a negative one such as a user placing a content producer on a blocked sender list.

Certain relationship interactions may be given more weight than others. For example, on a social networking website, the strength factor increase when a user views a content producer's profile may be of a less degree than the strength factor increase when a user sends a content producer an email message. In addition, a user may set predetermined, user-configurable weighing criteria to influence the strength factor assigned to different content producers. A user may value certain relationship interactions over others and configure the determination module 408 to give added weight to those interactions in calculating the strength factor.

In one embodiment, the user interactions with a content producer at a user's employment may have a greater increase on the strength factor than user interactions with friends or family. Alternatively, or in addition, the strength factor may also be based on the type of device which supplied the content. For example, a user may give priority to images produced by digital cameras versus images produced by a graphics editing program.

In one embodiment, a higher content producer strength factor increases the relevancy weight of all media content associated from that content producer. Therefore, each time a user interacts with a content producer on the social networking site or calls a content producer with her cell phone, the strength factor will increase and additional weight will be given to that content producer's digital media.

Furthermore, the relevancy weight may also be influenced by historical actions the user has taken with digital media content from a content producer. For example, if a user consistently deletes digital media content from a certain content producer, then the relevancy weight for that content producer will be decreased. In some embodiments, the relevancy weight may also be affected by what other members, who have relationships with the user, have done with the digital media content item. For example, if several users who have a strong relationship with the user have referenced or commented on the item, then the relevancy weight increases.

The presentation module 410, in one embodiment, presents the digital media content published by one or more of the content producers to the user. The presentation module 410 may present all the content from every content producers in order based on weight. Also, the presentation module 410 may present only a predetermined amount of media content or media content that meets a certain threshold. Therefore, media content that does not meet the threshold is not presented, or presented at a later time. Furthermore, a user may select to only have media content delivered from a specific content producer in order of relevancy or from a group of content producers. Similarly, a user may select to have media content delivered relating to a certain subject or area of interest.

By basing the relevancy and strength of content on a user's interactions with content producers, a user does not have to expend any additional effort in order to get a customized selection of current digital media of significant interest. In addition, the user will be able to automatically enjoy the "interesting" media that is available instead of being concerned with filtering through the mass quantity of media that is available from users with whom he may not have a strong connection.

The presentation module 410 may deliver the digital media in a custom application capable of displaying digital images, audio, video, and other media formats. In addition, the presentation module may utilize the existing media display capabilities of a client device 202. Furthermore, if a social networking site is being used on the client 202, the presentation module 410 may deliver the digital media content through the usual channels employed by the social networking website for viewing content. For example, a user using a social networking website may have the media content from the presentation module delivered to her in her "messages" folder.

In addition, the type of delivery may also be configurable or may be associated with the strength of the user relationship. For example, delivery may comprise active delivery or passive delivery. Active delivery may include actions such as sending the media content or a notification of the media content to a personal device 202 the user is likely to have on hand. This delivery may interrupt the user to notify the user of the new content or interrupts the user to provide the new content. The device may include but is not limited to a cell phone, PDA, work computer, work email, or instant messenger.

Passive delivery may comprise actions such has sending the content or a notice of the content to an email address, or a message board on the user's social networking site or account. Passive delivery may also include sending the content to a digital picture frame or desktop screen saver. Passive delivery may consist of actions that do not interrupt the user but still provide the highest weighted content without the user performing any searching.

Figure 5:
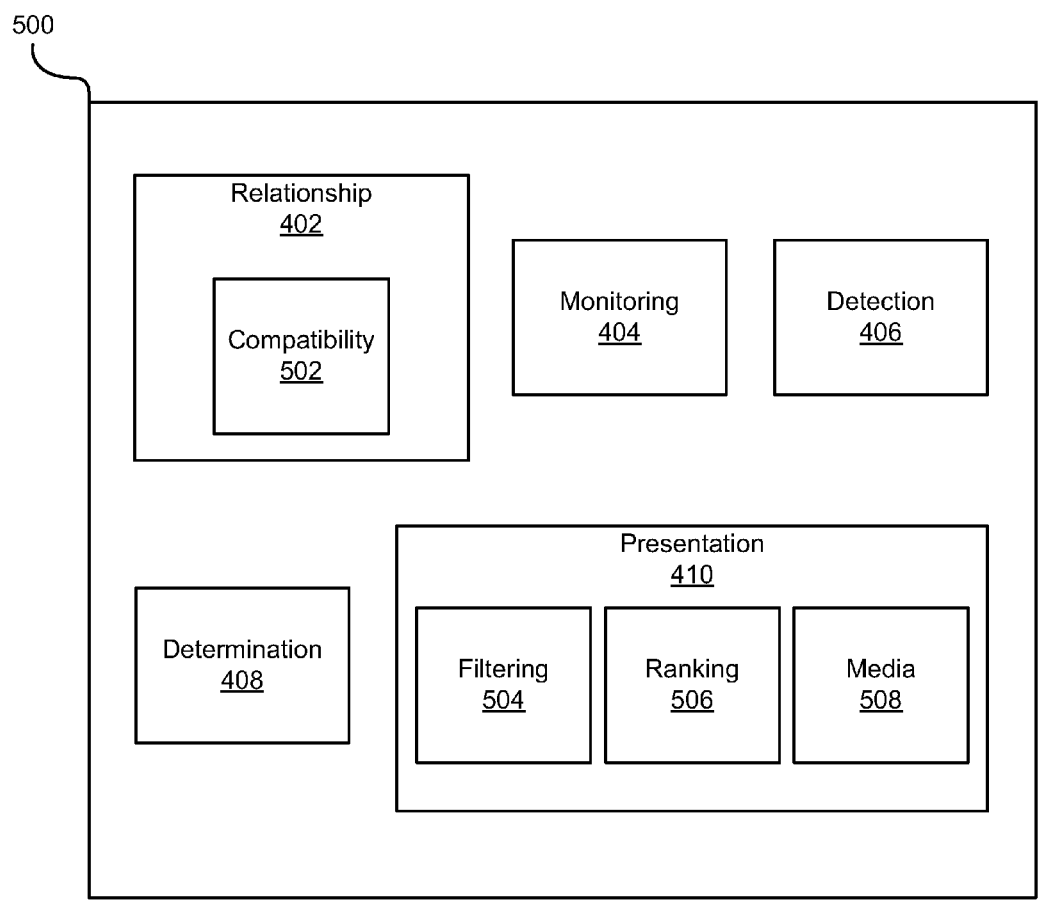
FIG. 5 is a detailed schematic block diagram illustrating one embodiment of an apparatus for automated digital media content filtration based on relationship monitoring.

FIG. 5 illustrates another embodiment of an apparatus 500 for automated digital media content filtration based on relationship monitoring. The apparatus 500 includes the relationship module 402, the monitoring module 404, the detection module 406, the determination module 408, and the presentation module 410, wherein these modules include substantially the same features as described above with relation to FIG. 4.

Additionally, the relationship module 402 may contain a compatibility module 502. The compatibility module 502 may detect profile compatibility between a user profile and a content producer profile. Furthermore, the compatibility module 502 may modify the associated user relationship to reflect the profile compatibility. The relevancy weight of digital media content may be increased by a predetermined amount if the user profile and content producer profile are determined to have a strong compatibility. For example, the strength factor with individuals with whom the user has high profile compatibility may be greater, thus influencing the relevancy weight of the associated media content.

The profile compatibility may be based in part on mutual interests between the user and the content producer that published the published digital media content. Mutual interests may include items such as number of mutual friends, attendance at the same school, pursuit of the same educational major, a common year of graduation, work, company, and personal information like hometown, favorite music, favorite movies, and so forth. The compatibility module may obtain these mutual interests from the social networking online profile associated with the user or content producer. A user may also manually enter mutual interests related to content producer.

In one embodiment, the presentation module 410 contains a filtering module 504. The filtering module 504 may filter a set of published media content based on the relevancy weight of each media content item and a user-configurable relevancy threshold. Media content that does not meet the threshold may be deleted or stored in an electronic folder based on user preference. In addition, the user may request that the filter results are sent to her by email or other messaging format.

Also, in some embodiments, the presentation module 410 contains a ranking module 506. The ranking module 506 may rank a set of published media content based on the relevancy weight of each media content item. The user is therefore able to view the media content in order of that content which would be of most interest to the user.

Finally, in certain embodiments, the presentation module 410 may contain a media module 508. The media module 508 may push a set of published media content to a media aggregator 204 based on the relevancy weight of each media content and/or a user-configurable relevancy threshold. The media aggregator 204 and user-configurable relevancy threshold may be defined in a media publication profile associated with the user. As mentioned above, the media aggregator 204 may operate on one of several electronic devices 202 configured to receive the pushed media. Furthermore, the push method could be an RSS ("Really Simple Syndication") feed or any other content or web delivery system. A user may therefore have his favorite or most relevant media delivered to a device 202 of his choice. Furthermore, a user may configure various forms of media to be pushed to various devices. For example, a user may wish to have all digital audio pushed to a digital audio player but may wish to have all digital images pushed to a digital picture frame. Moreover, the media module 508 may heuristically derive where to push certain types of content based on past user requests and usage patterns of other close contacts in the social network.

A method for automated digital media content filtration based on relationship monitoring may be implemented by the executed operations of a computer program product. The method starts when the relationship module 402 determines a plurality of user relationships between a user and a content producer. The monitoring module 404 monitors each of these user relationships for a relationship interaction such as an email, a message on a social networking website, a phone call, and other interactions as described above. Next, the detection module 406 identifies digital media content published by a content producer with whom the user has a user relationship. The determination module 408 determines a relevancy weight for each published digital media content item using a strength factor derived in part from the user relationship which is based on the relationship interactions identified by the monitoring module 404. The strength factor typically increases as the number of relationship interactions increase. Likewise, the quality or nature of the relationship interactions may also determine the strength factor as certain interactions may be assigned more weight by the system or user. Finally, the presentation module 410 presents digital media content published by one or more of the content producers to the user, the higher weighted content receives priority. Then the method ends.

Figure 6:
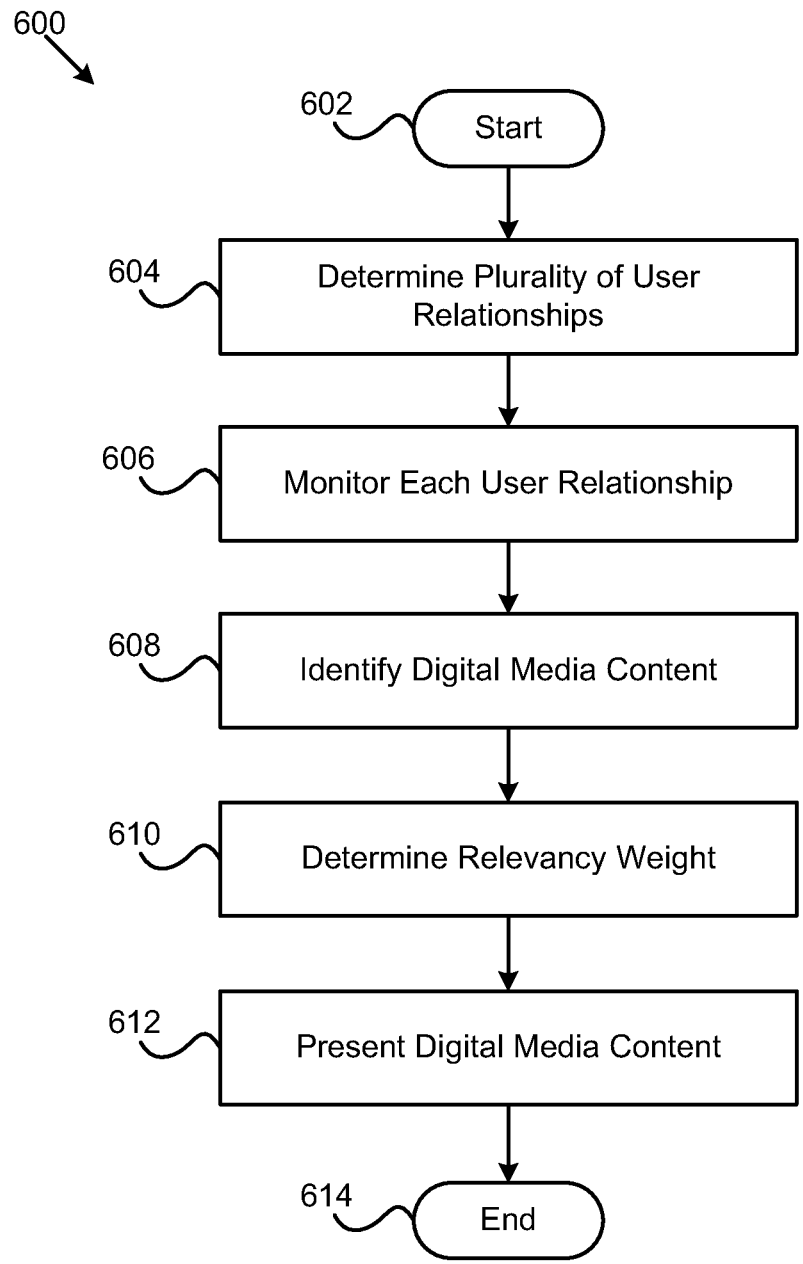
FIG. 6 is a schematic flow chart diagram illustrating one embodiment of a method for automated digital media content filtration based on relationship monitoring.
Figure 7:
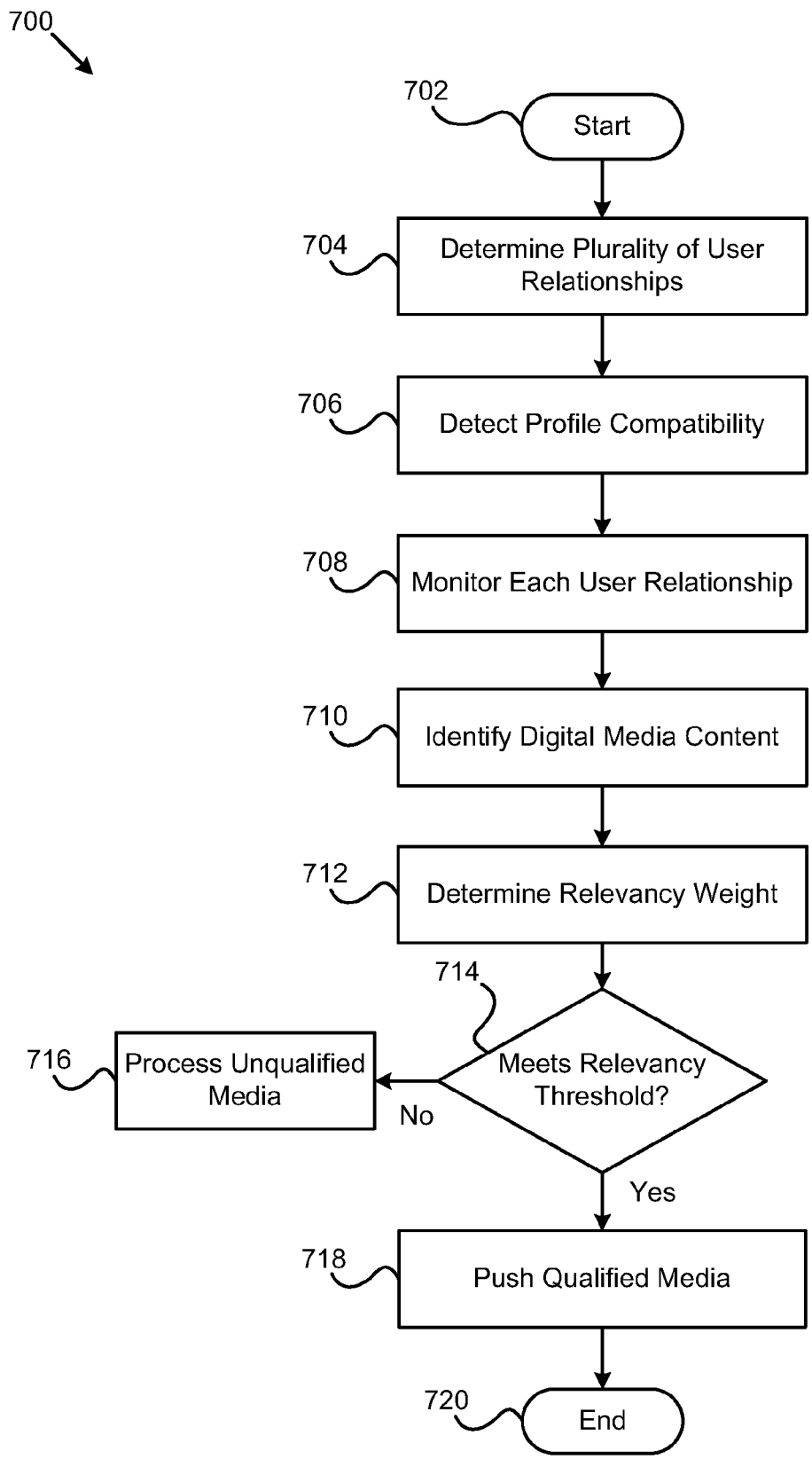
FIG. 7 is a detailed schematic flow chart diagram illustrating one embodiment of a method for automated digital media content filtration based on relationship monitoring.

FIG. 6 illustrates a detailed embodiment of a method 600 for automated digital media content filtration based on relationship monitoring. The method 600 may also be implemented by the executed operations of a computer program product. The method 600 starts 602 when the relationship module 402 determines 604 a plurality of user relationships between a user and a content producer. The user relationship may be defined by "friends" relationships on a social networking site, may be derived from a user's contact list on a cell phone and/or other relationships made online or through electronic communications. Next, the compatibility module 502 detects 606 profile compatibility between the user's profile and that of the content producers. If a content producer has mutual interests or other profile similarities with a user, a strong profile compatibility is established and associated with that content producer. In turn, the strength factor may be increased for that content producer due to the recognized profile compatibility and the digital media content associated with the content producer will be accorded a greater relevancy weight.

The monitoring module 404 then monitors 608 each of these user relationships for a relationship interaction. If the media filtering apparatus 212 is implemented on a third party server 210, the monitoring module 404 may pull interaction data describing relationship interactions from a plurality of social networking websites, email and other communication programs, and cellular systems. Next, the detection module 406 identifies 610 digital media content published by a content producer with whom the user has a user relationship. The detection module 406 may be configured to detect 610 particular media formats such as HTML files, image files such as a Bitmaps, or audio files.

Once digital media content has been identified 610 by the detection module 406, the determination module 408 determines 612 a relevancy weight for such content. If the strength factor between the user and content producer is high, this indicates that the user has a greater "connection" or relationship with the content producer and hence, has a higher interest in media content from said producer. The published content is then filtered 614 by the filtering module 504.

Next, the method 600 determines 614 whether the weight of the media content meets a user-configurable threshold. If not, the media content is processed 616 by the filtering module 504. The processing may comprise deleting said media content, storing the media content in a user-specified location, or a similar action. Conversely, if the media content meets 614 the user-specified relevancy threshold, the media module 508 may push 618 the media content to a media aggregator 204 on a user client device 202. Then, the method 600 ends 620.

For example, a user named Sam may add two contacts on a social networking website: Larry and John. The relationship module 402 determines 604 that a user relationship exists between Sam and Alice, and Sam and John. The compatibility module 502 then detects 606 profile compatibility between Sam and John because they are from the same hometown as specified in their website profiles. The monitoring module 404 then monitors 608 the user relationship between Sam and Larry and Sam and John for a relationship interaction. Sam sends Alice five messages and one comment and receives five messages from Alice. The five sent messages, comment, and five received messages are monitored 608 by the monitoring module 404 as relationship interactions. In turn, Sam sends John ten messages and five comments and receives ten messages and five comments from John which are also monitored 608 as relationship interactions.

Next, the detection module 406 detects 610 a collection of digital images of Alice's vacation contained in the five received messages from Alice and some digital audio files of John's band in the ten messages received from John. The determination module 408 determines 612 a relevancy weight for the images from Alice based on the strength factor as derived from the relationship interactions. Likewise, the determination module 408 determines 612 a relevancy weight for the audio files from John based on the strength factor as derived from the relationship interactions. The strength factor for John is higher based on the greater number of relationship interactions and the profile compatibility. Therefore, the determination module 408 determines that the audio files from John have a greater relevancy weight than the images from Alice.

The digital images and digital audio are filtered 614 by the filtering module 504. Alice's vacation images do not meet 614 the relevancy threshold configured by Sam and the images are deleted 616 by the filtering module 504. However, the digital images from John meet 614 the relevancy threshold specified by Sam and the media module 508 pushes 618 the digital images to a digital audio application 204 on Sam's portable electronic audio player 202.

Suppose that Alice had broadcast the collection of digital images of her vacation to an entire community on a social networking website. Alice's friends John, Liz, and Melissa are part of the online community. John and Liz have the media filter 212 operating on the digital media content they receive. Melissa does not. John, Liz and Melissa may all be extremely interested in Alice's vacation photos. Based on monitored relationships between John and Alice and Liz and Alice, the relevancy strength of Alice's vacation photos meets the relevancy threshold specified and the media module 508 pushes the digital images of Alice's vacation to John's computer and the digital picture frame owned by Liz. Conversely, the digital images are buried in Melissa's website account by dozens of other images from people that Melissa does not know well and by advertisements. Melissa finds the vacation photos two weeks later.

According to aspects of the present invention, a method is presented comprising determining a plurality of user relationships, monitoring each user relationship, detecting digital media content, determining a relevancy weight, and presenting digital media content. In an embodiment, the method includes determining a plurality of user relationships. Each user relationship is based at least in part on an online association between a user and a content producer. The method may also define monitoring each user relationship with each content producer for a relationship interaction between the user and the content producer. Furthermore, the method may also identify digital media content published by the content producer having one of the user relationships with the user from the plurality of user relationships. Also the digital media content may comprise at least one digital media content item In addition, the method may include determining a relevancy weight for each published digital media content item. The relevancy is based on a strength factor derived at least in part on monitored relationship interactions between the user and the content producer that published the published digital media content. Moreover, the method may present digital media content published by one or more of the content producers to the user. When being presented, the digital media content having a greater relevancy weight receives a higher priority than other digital media content available to the user from the plurality of content producers.

In an embodiment, monitoring further comprises detecting profile compatibility between a user profile and a content producer profile and modifying the associated user relationship to reflect the profile compatibility. In this embodiment, the profile compatibility may be based at least in part on one or more mutual interests between the user and the content producer that published the published digital media content. In another embodiment, presenting further comprises filtering a set of published digital media content based on the relevancy weight of each digital media content item and a user-configurable relevancy threshold. Presenting may also further comprise ranking a set of published digital media content items based on the relevancy weight of each digital media content item.

Furthermore, presenting may further comprise pushing a set of published digital media content items to a media aggregator based on the relevancy weight of each digital media content item and a user-configurable relevancy threshold. In this embodiment, the media aggregator and user-configurable relevancy threshold are defined in a media aggregator profile associated with the user.

In an embodiment, the plurality of user relationships comprise a plurality of user relationships defined within a social networking internet site. In addition, in one embodiment, the strength factor is derived at least in part from user-configurable weighing criteria. Also, the media aggregator may comprise a social networking website that stores and presents digital media content.

An apparatus for automated digital media content filtration based on relationship monitoring is provided with a plurality of modules configured to functionally perform the necessary steps as described above in relation to the method. These modules in the described embodiments include a relationship module, a monitoring module, a detection module, a determination module, and a presentation module. Furthermore, in other embodiments, the content producer is a social networking website that publishes digital media content to a user.

A system of the present invention is also presented for authenticating a user based on authentication credentials and location information. The system may be embodied as a network configured to communicate data between a plurality of devices, a social networking server in communication with the network, and a client in communication with the network, the client comprising a media aggregator. Furthermore, the system also may comprise a media filtering server in communication with the network with modules configured to functionally perform the necessary steps as described above in relation to the method and apparatus.

A computer program product is also presented for automated digital media content filtration on a social networking website based on relationship monitoring. The instructions of the computer program product may determine a plurality of user relationships, each user relationship based at least in part on an online association between a user and a content producer. In addition, the computer program product may monitor each user relationship with each content producer for a relationship interaction between the user and the content producer. The computer program product may also detect digital media content published by a content producer having a relationship with the user.

Moreover, the computer program product may determine a relevancy weight for each published digital media content item. The relevancy may be based on a strength factor derived at least in part on monitored relationship interactions between the user and the content producer that published the published digital media content. Additionally, the computer program product may push a set of published media content to a media aggregator based on the relevancy weight of each media content item and a user-configurable relevancy threshold. The media aggregator and user-configurable relevancy threshold may be defined in a media publication profile associated with the user.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for automated digital media content filtration based on relationship monitoring, the method comprising:
establishing automatically, by a processor, according to a tolerance parameter, a plurality of user relationships, each user relationship based on monitoring an online association between a user and a content producer;

monitoring determined user relationships for relationship interactions;

interacting with a plurality of independent servers as a third party to identify digital media content published by content producers having one of the user relationships with the user from the plurality of user relationships, the digital media content comprising at least one digital media content item;

determining a relevancy weight for each published digital media content item, the relevancy based on a strength factor derived on monitored relationship interactions between the user and the content producer that published the published digital media content; and presenting the digital media content published by one or more of the content producers to the user such that digital media content having a greater relevancy weight receives a higher priority than other digital media content available to the user from the plurality of content producers.

2. The method of claim 1 wherein presenting the digital media content further comprises pushing a set of published digital media content items to a media aggregator based on the relevancy weight of each digital media content item and a user-configurable relevancy threshold, the media aggregator and user-configurable relevancy threshold defined in a media aggregator profile associated with the user.

3. The method of claim 1 wherein monitoring determined user relationships further comprises detecting profile compatibility between a user profile and a content producer profile and modifying the associated user relationship to reflect the profile compatibility.

4. The method of claim 3 wherein detecting profile compatibility further comprises detecting profile compatibility based at least in part on one or more mutual interests between the user and the content producer that published the published digital media content.

5. The method of claim 1 wherein presenting the digital media content further comprises filtering a set of published digital media content items based on the relevancy weight of each digital media content item and a user-configurable relevancy threshold.

6. The method of claim 1 wherein presenting the digital media content further comprises ranking a set of published digital media content items based on the relevancy weight of each digital media content items.

7. The method of claim 1 wherein establishing a plurality of user relationships comprises establishing a plurality of user relationships defined within a social networking internet site.

8. The method of claim 1 wherein determining a relevancy weight for each published digital media content item based on a strength factor comprises deriving the strength factor at least in part from user-configurable weighing criteria.

9. A computer-readable storage device with an executable program stored thereon, wherein the program instructs a processor to perform:

establishing automatically, according to a tolerance parameter, a plurality of user relationships, each user relationship based on monitoring an online association between a user and a content producer;

monitoring determined user relationships for relationship interactions;

interacting with a plurality of independent servers as a third party, to identify digital media content published by content producers having one of the user relationships with the user from the plurality of user relationships, the digital media content comprising at least one digital media content item;

determining a relevancy weight for each published digital media content item, the relevancy based on a strength factor derived on monitored relationship interactions between the user and the content producer that published the published digital media content; and presenting the digital media content published by one or more of the content producers to the user such that digital media content having a greater relevancy weight receives a higher priority than other digital media content available to the user from the plurality of content producers.

10. The computer-readable storage device of claim 9 wherein the executable program for presenting the digital media content further comprises executable program code for pushing a set of published digital media content items to a media aggregator based on the relevancy weight of each digital media content item and a user-configurable relevancy threshold, the media aggregator and user-configurable relevancy threshold defined in a media aggregator profile associated with the user.

11. The computer-readable storage device of claim 9 wherein the executable program for monitoring determined user relationships further comprises executable program code for detecting profile compatibility between a user profile and a content producer profile and modifying the associated user relationship to reflect the profile compatibility.

12. The computer-readable storage device of claim 11 wherein the executable program for detecting profile compatibility further comprises executable program code for detecting profile compatibility based at least in part on one or more mutual interests between the user and the content producer that published the published digital media content.

13. The computer-readable storage device of claim 9 wherein the executable program for presenting the digital media content further comprises executable program code for filtering a set of published digital media content items based on the relevancy weight of each digital media content item and a user-configurable relevancy threshold.

14. The computer-readable storage device of claim 9 wherein the executable program for presenting the digital media content further comprises executable program code for ranking a set of published digital media content items based on the relevancy weight of each digital media content items.

15. The computer-readable storage device of claim 9 wherein the executable program for establishing a plurality of user relationships comprises executable program code for establishing a plurality of user relationships defined within a social networking internet site.

16. The computer-readable storage device of claim 9 wherein the executable program for determining a relevancy weight for each published digital media content item based on a strength factor comprises executable program code for deriving the strength factor at least in part from user-configurable weighing criteria.

17. An apparatus for automated digital media content filtration based on relationship monitoring, the apparatus comprising:

a processor coupled to memory, the processor programmed by program code stored in the memory to implement:

a relationship module configured to establish automatically, according to a tolerance parameter, a plurality of user relationships, each user relationship based on monitoring an online association between a user and a content producer;

a monitoring module configured to monitor determined user relationships for relationship interactions;

a detection module configured to interact with a plurality of independent servers as a third party, to identify digital media content published by content producers having one of the user relationships with the user from the plurality of user relationships, the digital media content comprising at least one digital media content item;

a determination module configured to determine a relevancy weight for each published digital media content item, the relevancy based on a strength factor derived on monitored relationship interactions between the user and the content producer that published the published digital media content; and a presentation module configured to present the digital media content published by one or more of the content producers to the user such that digital media content having a greater relevancy weight receives a higher priority than other digital media content available to the user from the plurality of content producers.

18. The apparatus of claim 17 wherein the executable program for presenting the digital media content further comprises executable program code for pushing a set of published digital media content items to a media aggregator based on the relevancy weight of each digital media content item and a user-configurable relevancy threshold, the media aggregator and user-configurable relevancy threshold defined in a media aggregator profile associated with the user.

19. The apparatus of claim 17 wherein the executable program for monitoring determined user relationships further comprises executable program code for detecting profile compatibility between a user profile and a content producer profile and modifying the associated user relationship to reflect the profile compatibility.

20. The apparatus of claim 19 wherein the executable program for detecting profile compatibility further comprises executable program code for detecting profile compatibility based at least in part on one or more mutual interests between the user and the content producer that published the published digital media content.

21. The apparatus of claim 17 wherein the executable program for presenting the digital media content further comprises executable program code for filtering a set of published digital media content items based on the relevancy weight of each digital media content item and a user-configurable relevancy threshold.

22. The apparatus of claim 17 wherein the executable program for presenting the digital media content further comprises executable program code for ranking a set of published digital media content items based on the relevancy weight of each digital media content items.

23. The apparatus of claim 17 wherein the executable program for establishing a plurality of user relationships comprises executable program code for establishing a plurality of user relationships defined within a social networking internet site.

24. The apparatus of claim 17 wherein the executable program for determining a relevancy weight for each published digital media content item based on a strength factor comprises executable program code for deriving the strength factor at least in part from user-configurable weighing criteria.

* * * * *